United States Patent [19]

Terenghi

[11] Patent Number: 5,430,833
[45] Date of Patent: Jul. 4, 1995

[54] METHOD FOR THE GRAPHIC REPRESENTATION OF STATISTICAL DATA DERIVING FROM THE QUALITY CONTROL OF TESTING CARRIED OUT BY ANALYSIS LABORATORIES

[75] Inventor: Adriano Terenghi, Lacchiarella, Italy

[73] Assignee: D.M.S. Data Medical Services, S.r.L., Lacchiarella, Italy

[21] Appl. No.: 35,374

[22] Filed: Mar. 22, 1993

[30] Foreign Application Priority Data

Mar. 23, 1992 [IT] Italy ................... MI92A0656

[51] Int. Cl.$^6$ ............................................. G06F 15/00
[52] U.S. Cl. ..................................................... 395/140
[58] Field of Search ............... 395/118, 155, 161, 145, 395/148, 140; 345/131, 133, 134

[56] References Cited

U.S. PATENT DOCUMENTS 5,280,567 1/1994 Kobayashi .......................... 395/118
5,303,145 4/1994 Griffin et al. ....................... 364/401

*Primary Examiner*—Phu K. Nguyen
*Attorney, Agent, or Firm*—Cushman Darby & Cushman

[57] ABSTRACT

A method for the graphic representation of statistical data derived from quality control of testing carried out by analysis laboratories has a laser printer instructed by a personal computer produces the graphic representation on a sheet of A4 format paper. The graphic representation printed for each of the analysis laboratories in the quality control program has a Youden graph, a statistical table and a Shewhart diagram.

7 Claims, 4 Drawing Sheets

Fig. 1A (PRIOR ART)

| WEEK | | 37 | 38 | 39 | 40 | 41 | 42 | 43 | 44 | 45 | 46 | 47 | 48 |
|---|---|---|---|---|---|---|---|---|---|---|---|---|---|
| GLUCOSE | 1 | 128 | 150 | 85 | 210 | 76 | 183 | 142 | 67 | 162 | 113 | 191 | 96 |
|  | 3 | 128 | 155 | 88 | 208 | 75 | 181 | 141 | 61 | 168 | 115 | 195 | 101 |
|  | 4 | 100 | 97 | 97 | 101 | 102 | 101 | 100 | 109 | 96 | 99 | 98 | 97 |
| UREA | 1 | 64 | 45 | 84 | 23 | 91 | 37 | 55 | 96 | 42 | 73 | 27 | 78 |
|  | 3 | 62 | 48 | 83 | 21 | 89 | 34 | 55 | 96 | 41 | 69 | 27 | 76 |
|  | 4 | 103 | 94 | 102 | 112 | 102 | 108 | 100 | 100 | 102 | 106 | 99 | 103 |
| TOTAL PROTEINS | 1 | 6.70 | 6.10 | 6.70E | 5.40 | 7.30 | 5.70 | 6.60 | 7.40 | 5.80 | 6.60 | 5.10E | 6.70 |
|  | 3 | 6.65 | 6.27 | 7.22 | 5.51 | 7.41 | 5.89 | 6.46 | 7.60 | 6.08 | 6.84 | 5.70 | 7.03 |
|  | 4 | 101 | 97 | 93 | 98 | 99 | 97 | 102 | 97 | 95 | 96 | 89 | 95 |
| ALBUMIN | 1 | 4.03 | 3.87 | 4.22 | 3.33 | 4.70 | 3.50 | 4.13 | 4.70 | 3.62 | 4.23 | 3.13 | 4.38 |
|  | 2 | 4.02 | 3.98 | 4.57 | 3.40 | 4.80 | 3.57 | 4.04 | 4.80 | 3.79 | 4.40 | 3.47 | 4.61 |
|  | 3 | 3.97 | 3.73 | 4.33 | 3.25 | 4.45 | 3.49 | 3.85 | 4.57 | 3.61 | 4.09 | 3.37 | 4.21 |
|  | 4 | 101 | 107 | 106 | 105 | 108 | 102 | 105 | 105 | 105 | 108 | 103 | 110 |
| SODIUM | 1 | 136 | 136E | 125 | 158 | 120 | 149 | 137 | 121 | 143 | 136 | 151 | 130 |
|  | 3 | 136 | 142 | 127 | 154 | 124 | 148 | 139 | 121 | 145 | 133 | 151 | 130 |
|  | 4 | 100 | 96 | 99 | 101 | 97 | 101 | 99 | 100 | 99 | 102 | 100 | 100 |
| POTASSIUM | 1 | 4.70 | 4.00E | 5.60 | 3.20 | 5.80 | 3.70 | 4.40 | 5.90 | 3.80 | 5.20 | 3.30 | 5.30 |
|  | 3 | 4.79 | 4.27 | 5.57 | 3.23 | 5.83 | 3.75 | 4.53 | 6.09 | 4.01 | 5.05 | 3.49 | 5.31 |
|  | 4 | 98 | 94 | 101 | 99 | 99 | 99 | 97 | 97 | 95 | 103 | 95 | 100 |
| CALCIUM | 1 | 11.20 | 11.60 | 8.40E | 11.60 | 9.20 | 10.80 | 10.40 | 0.00 | 0.00 | 0.00 | 11.60 | 10.00 |
|  | 3 | 11.05 | 11.55 | 10.30 | 12.55 | 10.05 | 12.05 | 11.30 | 0.00 | 0.00 | 0.00 | 12.30 | 10.55 |
|  | 4 | 101 | 100 | 82 | 92 | 92 | 90 | 92 | 0 | 0 | 0 | 94 | 95 |
| PHOSPHORUS | 1 | 6.20 | 6.30 | 5.70 | 7.00 | 5.50 | 6.70 | 6.30 | 5.70 | 6.60 | 6.30 | 7.00 | 5.90 |
|  | 3 | 6.58 | 6.78 | 6.28 | 7.18 | 6.18 | 6.98 | 6.68 | 6.08 | 6.88 | 6.48 | 7.08 | 6.38 |
|  | 4 | 94 | 93 | 91 | 97 | 89 | 96 | 94 | 94 | 96 | 97 | 99 | 92 |

1 = STANDARD VALUES/RESULTS
2 = ADJUSTED VALUES
3 = EXPECTED VALUES
4 = PERCENTAGE RESULTS (1/3 = 100 or 2/3 = 100)

E = ANOMOLOUS RESULTS EXCLUDED FROM STATISTICAL CALCULATIONS
N = VALUES EXCLUDED FROM STATISTICAL CALCULATIONS POOR NUMBER

Fig. 1B
(PRIOR ART)

| WEEK | | 37 | 38 | 39 | 40 | 41 | 42 | 43 | 44 | 45 | 46 | 47 | 48 |
|---|---|---|---|---|---|---|---|---|---|---|---|---|---|
| IRON | 1 | 149 | 137 | 172 | 97 | 186 | 117 | 142 | 183 | 114 | 162 | 0.00 | 165 |
|  | 3 | 138 | 123 | 161 | 93 | 169 | 108 | 131 | 177 | 116 | 146 | 0.00 | 154 |
|  | 4 | 108 | 111 | 107 | 105 | 110 | 108 | 109 | 104 | 99 | 111 | 0 | 107 |
| URIC ACID | 1 | 5.20 | 4.00 | 6.20 | 2.40 | 7.20 | 3.30 | 4.60 | 6.90 | 4.10 | 6.00 | 3.40 | 6.40 |
|  | 3 | 5.50 | 4.62 | 6.82 | 2.86 | 7.26 | 3.74 | 5.06 | 7.70 | 4.18 | 5.94 | 3.30 | 6.38 |
|  | 4 | 95 | 87 | 91 | 84 | 99 | 88 | 91 | 90 | 98 | 101 | 103 | 100 |
| CREATININE | 1 | 1.90 | 1.40 | 2.40 | 0.80 | 2.50 | 1.20 | 1.80 | 2.70 | 1.30 | 2.00 | 0.80E | 2.10 |
|  | 3 | 1.90 | 1.60 | 2.35 | 1.00 | 2.50 | 1.30 | 1.75 | 2.65 | 1.45 | 2.05 | 1.15 | 2.20 |
|  | 4 | 100 | 88 | 102 | 80 | 100 | 92 | 103 | 102 | 90 | 98 | 70 | 95 |
| BILIRUBIN | 1 | 1.40 | 1.30 | 1.90 | 0.80 | 2.00 | 1.10 | 1.60 | 2.30 | 1.20 | 1.60 | 1.10 | 1.80 |
|  | 3 | 1.48 | 1.28 | 1.78 | 0.88 | 1.88 | 1.08 | 1.38 | 1.98 | 1.18 | 1.58 | 0.96 | 1.68 |
|  | 4 | 95 | 102 | 107 | 91 | 106 | 102 | 116 | 116 | 102 | 101 | 112 | 107 |
| CHOLESTEROL | 1 | 180 | 160 | 180 | 147 | 207E | 157 | 164 | 175 | 153 | 177 | 137 | 179 |
|  | 3 | 164 | 154 | 179 | 134 | 183 | 144 | 159 | 188 | 149 | 169 | 139 | 174 |
|  | 4 | 110 | 104 | 101 | 110 | 113 | 109 | 103 | 93 | 103 | 105 | 99 | 103 |
| TRIGLYCERIDES | 1 | 142 | 117 | 160 | 73 | 184 | 100 | 126 | 174 | 104 | 156 | 82 | 161 |
|  | 3 | 138 | 119 | 166 | 82 | 175 | 101 | 129 | 184 | 110 | 147 | 92 | 157 |
|  | 4 | 103 | 98 | 97 | 89 | 105 | 99 | 98 | 94 | 94 | 106 | 90 | 103 |
| TRANSFERRIN | 1 | 306 | 261 | 311 | 244 | 309 | 291 | 0.00 | 349 | 274 | 310 | 237 | 339 |
|  | 3 | 290 | 273 | 315 | 239 | 324 | 256 | 0.00 | 332 | 264 | 298 | 247 | 307 |
|  | 4 | 106 | 96 | 99 | 102 | 95 | 114 | 0 | 105 | 104 | 104 | 96 | 110 |
| AST.(GOT) | 1 | 128 | 94 | 181 | 33 | 195 | 69 | 116 | 213 | 81 | 148 | 48 | 160 |
|  | 3 | 140 | 106 | 190 | 39 | 207 | 73 | 123 | 224 | 89 | 157 | 56 | 173 |
|  | 4 | 92 | 89 | 95 | 85 | 94 | 95 | 94 | 95 | 91 | 95 | 86 | 92 |

1 = STANDARD VALUES/RESULTS
2 = ADJUSTED VALUES
3 = EXPECTED VALUES
4 = PERCENTAGE RESULTS (1/3 = 100 or 2/3 = 100)

E = ANOMOLOUS RESULTS EXCLUDED FROM STATISTICAL CALCULATIONS
N = VALUES EXCLUDED FROM STATISTICAL CALCULATIONS POOR NUMBER

METHOD FOR THE GRAPHIC REPRESENTATION OF STATISTICAL DATA DERIVING FROM THE QUALITY CONTROL OF TESTING CARRIED OUT BY ANALYSIS LABORATORIES

BACKGROUND OF THE INVENTION

1. Field of the Invention

The present invention relates to a method of graphically representing statistical data derived from the quality control of testing carried out by analysis laboratories. The method allows a quick and easy comparison of an analysis laboratory to all analysis laboratories for determining the quality and the reliability of results from an analysis laboratory.

2. Description of Related Art

Quality control of analysis laboratories in the biomedical sector, food sector, etc. is of constant importance. For instance, in a clinical biochemical analysis, an erroneous collection of data can suggest a pathology which in reality is non-existent, or masks an existent pathology. It does not take a businessman to realize the loss in man-hours, money, etc. which can occur from such a collection of erroneous data.

The concerns of time, money and efficiency demand the highest quality from analysis laboratories. Therefore, monitoring and evaluating the reliability of results produced by analysis laboratories is central to maintaining quality control. The art of statistics provides a convenient basis for carrying out the needed monitoring and evaluation functions of the required quality control.

The statistical view sees each analysis laboratory as a "signal intermediary", an instrument constructed for transforming "signals" present in test materials into comprehensible and interpretable "messages". In the statistical view, a "signal" collected and intermediated by an analysis laboratory does not constitute information until received, interpreted, and integrated. Consequently, an analysis laboratory, as the "signal intermediary", adds its own "noise" component to the collected signal.

This "noise" component, introduced by an analysis laboratory into the "signal" present in the tested material, must be suitably evaluated and reduced as much as possible by human intervention aimed to improve regulation of analysis equipment. Therefore, each analysis laboratory needs continuous individual analysis which involves comparison with other analysis laboratories, for improving the validity of test results.

Statistical indices such as the mean and standard deviation from the mean (or quadratic deviation), are useful in fulfilling the need for monitoring and evaluating individual laboratory analysis. Furthermore, the larger the number of analysis laboratories, "samples", participating in a quality control program, the more precise the statistical data generated for the statistical indices; i.e., the closer the statistical data comes to the statistical data for the entire "population" of analysis laboratories. Typically, results of analysis carried out on the same object or objects are the test results used in generating the statistical data for each statistical index against which a designated analysis laboratory is compared. Preferably, statistical data is generated using test data, referred to as "historical data", on two different objects, substances, or the same substance at two different concentrations. This allows better evaluation of analysis laboratory performance.

Computers organize the historical data, generate the statistical data, and present the results thereof automatically. A graphic presentation of the results, which allows quick and easy summary and evaluation of the reliability of data produced by an analysis laboratory is preferred. Conventional systems for quality control of analysis laboratories employ essentially two types of graphic presentation:

(1) a totally numeric table, wherein the historical and statistical data are presented in their numeric form organized into a table as shown in FIG. 1; and (2) numeric and partly graphic table, wherein the historic data and statistical data are represented in a less detailed numeric table which is supplemented by a graph as shown in FIG. 2.

The numeric table of FIGS. 1A–1B presents the historical data on chemico-clinical analysis generated weekly for a three month period by a designated analysis laboratory. Test results are not readily ascertainable. An evaluator must digest numerous numeric values to gain insight into the quality of laboratory performance. Additionally, a direct comparison with other analysis laboratories is not possible from the numeric table of FIGS. 1A–1B. Several such tables need analyzing to make such a comparison.

The graphic representation of FIG. 2 provides an improved presentation over that of FIGS. 1A–1B. The graphic representation of FIG. 2 splits the representation into a less detailed numeric table on the right half of the page, and a graph or diagram, known as a Youden graph on the left half of the page. The graphic representation is printed on a sheet of paper in landscape.

A Youden graph represents the historical data for each laboratory. FIG. 2 illustrates a Youden graph of the historical data produced by each analysis laboratory in the testing of two substances or the same substance at two different concentrations. The Youden graph represents historical data based on the historical data's relation to the mean and standard deviation for the historical data of all the analysis laboratories. The Youden graph has a Cartesian coordinate system with the horizontal axis and the vertical axis corresponding to the two tested substances, respectively. Each axis is indexed by the mean and standard deviations of the historical data for the corresponding substance. The mean is centered on the axis and the standard deviations are indexed therefrom.

In FIG. 2 the Youden graph is divided into four quadrants by two perpendicular lines corresponding to the mean value on the X-axis, horizontal axis, and the mean value of the Y-axis, vertical axis. Furthermore, the corners of a box enclosing values within one and two standard deviation, as shown in FIG. 2, are printed on the Youden graph. In FIG. 2 the historical data from the various analysis laboratories are represented in the Youden graph with numbers and letters. The analysis laboratory under evaluation is marked with the letter X. Analysis laboratories whose historical data fall within the two standard deviation box are considered reliable. Analysis laboratories whose historical data fall outside the two standard deviation box are determined as laboratories which need to take steps to improve their test results.

The two squares designating the first and second standard deviation from the mean also include historical data which are actually outside the first and/or second standard deviation. These historical data are more than half a box length from the mean (more than a standard deviation from the mean); but are less than half a diagonal of the box from the mean. Therefore, these data point fall within the standard deviation box. Preferably, a circle representing the true first and second standard deviations should be printed on the Youden graph; however, the printers used by these conventional methods are incapable of complex printing, such as circles.

SUMMARY OF THE INVENTION

The object of the present invention is to provide a method for graphically representing statistical data derived from the quality control of testing carried out by laboratories which allows a quick and easy comparison of an analysis laboratory to all analysis laboratories for determining the quality and reliability of results from an analysis laboratory.

A further object of the present invention is to provide a method which overcomes the disadvantages of conventional methods.

A further object of the present invention is to provide a method which allows all graphic and numerical representation which can confirm a laboratory technicians calculations, and eliminates imprecision or inaccuracies from the representation.

A further object of the present invention is to provide a method which presents the graphical representations in a perfectly legible way on A4 paper.

The above and other objects are achieved by a method for graphically representing statistical data derived from the quality control of testing carried out by analysis laboratories. Each analysis laboratory having historical data of the testing. The method includes the steps of inputting the historical data of the analysis laboratories using a computer, inputting the statistical data which includes at least a mean and standard deviation of the historical data using the computer, preparing a Youden graph based on the statistical data using the computer, positioning the historical data of the analysis laboratories on the Youden graph using the computer, printing the Youden graph on a hard copy medium using a printer, preparing a Shewhart diagram based on the statistical data using the computer, positioning the historical data for a designated analysis laboratory in standard deviations on the Shewhart diagram using the computer, and printing the Shewhart diagram on the hard copy medium using the printer.

The Shewhart diagram represents a valid tool for quality control. A Shewhart diagram can illustrate a series of anomalous situations in which casual error (imprecision) and systematic error (inaccuracy) do not remain constant with respect to time. Thus, a Shewhart diagram is one of the most indicative means of evaluating and monitoring analysis laboratory quality; as well as, actions taken to improve that quality. The graphic representation produced by conventional quality control methods lack these capabilities since the conventional graphic representation use common printers for personal computers, which can not make complicated graphic representations like the Shewhart diagram.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIGS. 1A–1B are a totally numeric table used in a convention quality control system for clinical chemistry;

DETAILED DESCRIPTION OF THE INVENTION

Figure 3:
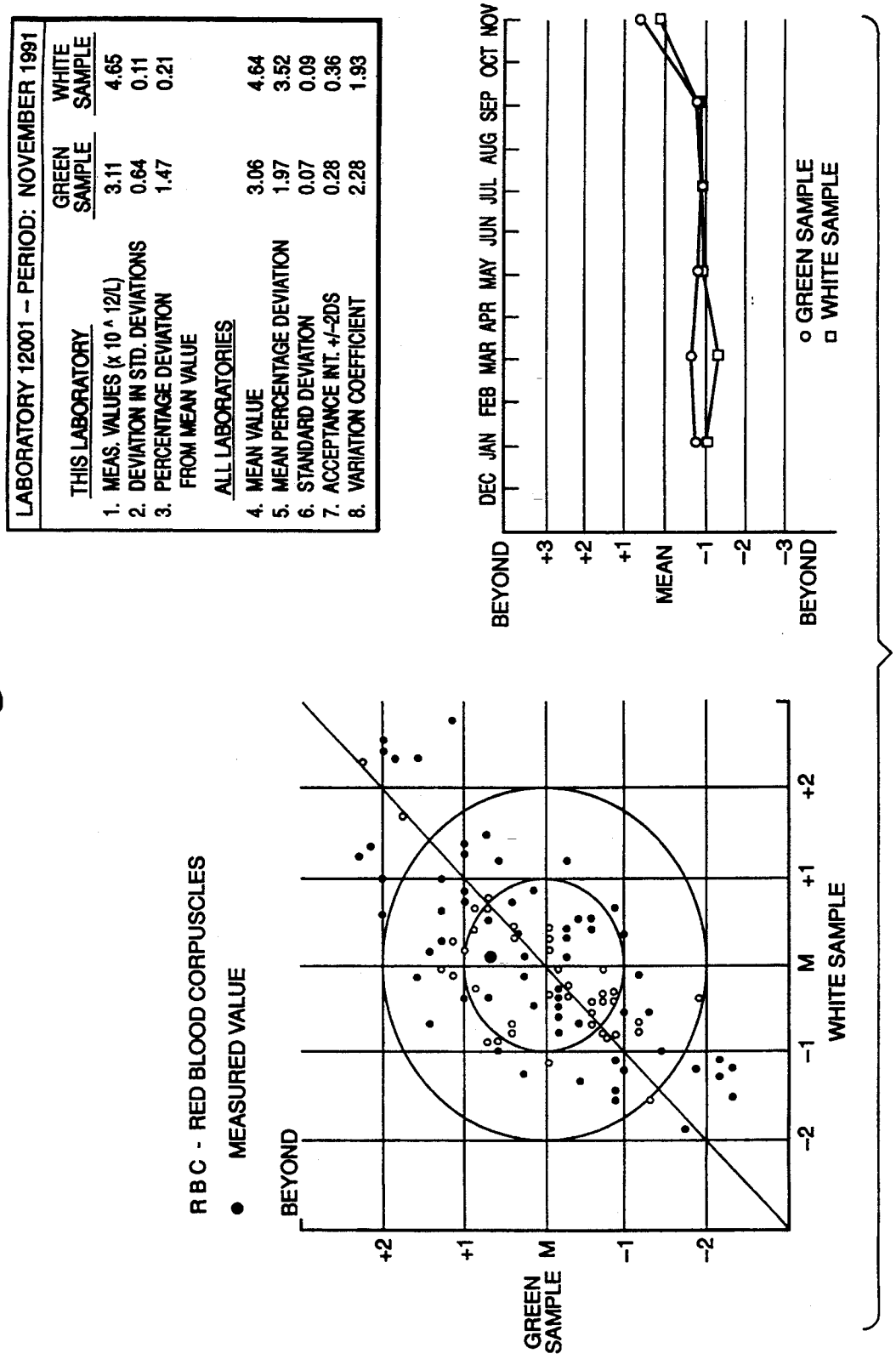
FIG. 3 is an example of the graphic representation produced according the method of the present invention.

In the example of FIG. 3 the analysis laboratories test the number of red corpuscles in two different samples; the "green sample" and the "white sample". According to the method of the present invention, for each analysis laboratory (called a receiver or designated laboratory) a printout as in FIG. 3 is produced. The printout is on A4 format sheet of paper in landscape and sub-divided into three main areas.

AREA I: THE YOUDEN GRAPH

Figure 2:
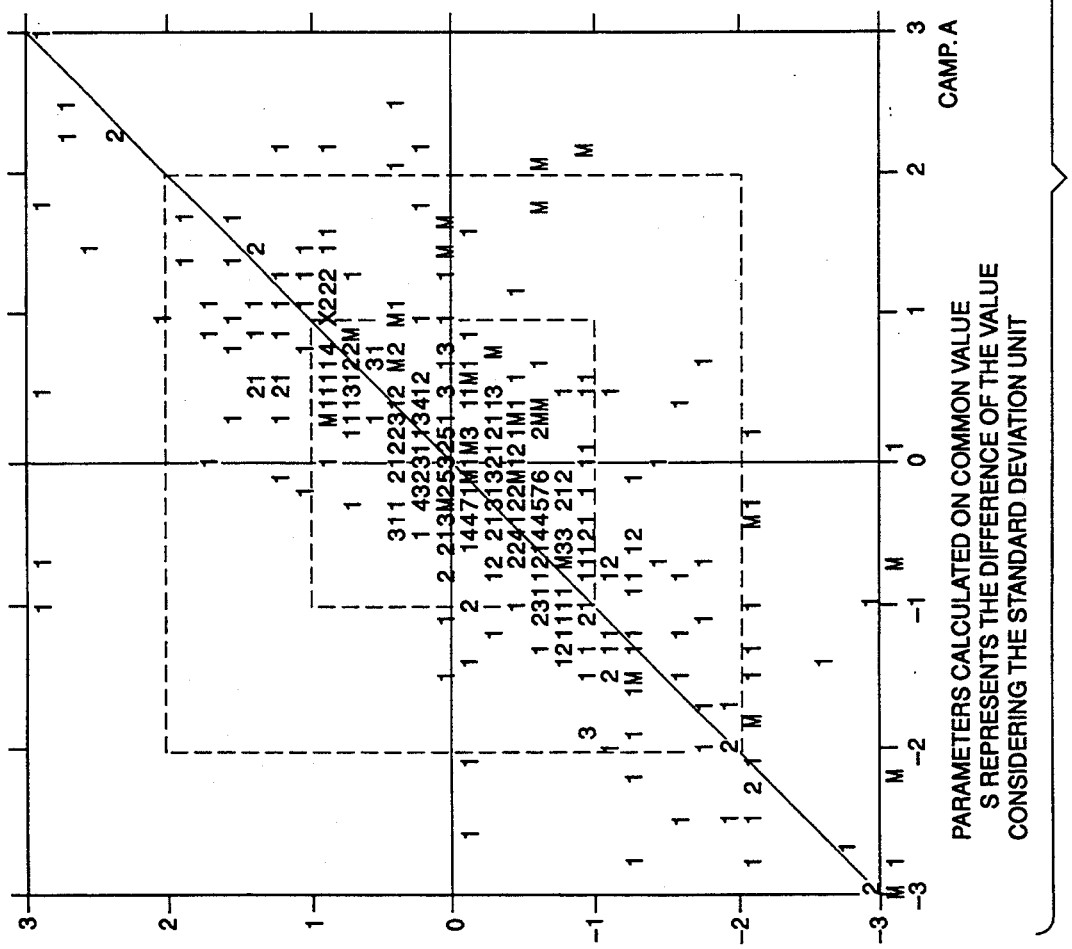
FIG. 2 is a combination numeric table and Youden graph, graphic representation used in a conventional quality control system for hematology.

The Youden graph occupies the left half of the sheet. As was described with respect to the Youden graph in FIG. 2, the Youden graph uses a Cartesian coordinate system with each axis corresponding to a tested sample. In the Youden graph of FIG. 3 the X-axis corresponds to the white sample and the y-axis corresponds to the green sample. The axes of the Youden graph are indexed by the mean and standard deviations of the historical data collected from all the analysis laboratories participating in the quality control program. The mean for each sample is centrally indexed on the corresponding axis, and the standard deviations are respectively indexed therefrom.

Perpendicular lines are printed for each coordinate point (mean and standard deviations) on the X-axis and Y-axis. The perpendicular lines corresponding to the mean for each sample cross in the center of the Youden graph. Printed on the Youden graph are two concentric circles centered at the center of the Youden graph and having a radius of one and two standard deviations, respectively. Unlike, the boxes in FIG. 2, the circles do not contain historical data which lie outside the first and second standard deviation, respectively. Use of a laser printer, which can perform complex printing, allows the printing of the circles by the method of the present invention.

Above the Youden graph is printed a legend or heading which defines the symbol representing the historical data of the designated laboratory to which the graphic representation corresponds. In FIG. 3 the symbol defining the designated analysis laboratory is a solid, black circle which is larger than the circles representing the historical data of the non-designated analysis laboratories. Therefore, the historical data of the designated laboratory is easily recognized.

AREA II: DESIGNATED ANALYSIS LABORATORY TABLE

This table occupies the upper portion of the right half of the sheet, and contains historical data of the designated analysis laboratory, statistical data for the designated analysis laboratory and statistical data of all the analysis laboratories. At the top of the table is printed a table heading which includes a code corresponding to the analysis laboratory and a period of evaluation. Below the table heading is printed the historical data of both the green and white sample for the designated analysis laboratory. The historical data includes the measured values for each sample.

Below the historical data is the statistical data for the designated analysis laboratory which includes the deviation from the mean (i.e., the mean of the historical data for all analysis laboratories) in standard deviations and the percentage deviation from the mean. Below the historical and statistical data for the designated analysis laboratory is the statistical data for all the analysis laboratories which includes the mean, the mean percentage deviation, the standard deviation, a two standard deviation acceptance interval, and a variation coefficient.

AREA III: SHEWHART DIAGRAM

The diagram or graph occupying the lower portion of the right half of the sheet is called a Shewhart diagram. A Shewhart diagram uses a Cartesian coordinate system with time on the horizontal, X-axis, and mean and standard deviations of the historical data for all the analysis laboratories indexing the vertical, Y-axis. The X-axis is typically indexed in days, weeks, or months. In FIG. 3, the X-axis of the Shewhart diagram is indexed in months. The center of the Y-axis is indexed as the mean, and the first, the second and the third positive and negative standard deviations are indexed symmetrically therefrom. Lines perpendicular to the mean and standard deviation indices on the Y-axis are printed.

Each months historical data for the tested samples is printed on the Shewhart diagram for the designated analysis laboratory. Different symbols are used to differentiate between the historical data for each tested sample. In FIG. 3 a circle defines the historical data for the green sample, and a square defines the historical data for the white sample. Furthermore, lines connecting two adjacent historical data of a sample on the Shewhart diagram are printed. This allows visualization of any trends or phenomena. At the bottom of the Shewhart diagram is printed a legend which defines the symbol associated with each tested sample.

The graphic representation produced by the method of the present invention allows quick and easy comparison of a designated analysis laboratory to all analysis laboratories. The reliability, quality, and any required improvements thereof are determinable at a glance from the graphic representation.

The method of forming the graphic representation of the present invention uses a laser printer, which is capable of drawing the complex shapes and graphs in FIG. 3, and an IBM compatible personal computer, which instructs the laser printer what to print. A file or files, previously prepared by known methods, which contain the statistical data of all the analysis laboratories, the statistical data of the designated analysis laboratory and the historical data of all the analysis laboratories is accessed by the personal computer.

Using the accessed data, the computer prepares a Youden graph and legend therefor. The legend defines the symbol which represents the historical data of the designated analysis laboratory on the Youden graph. The computer also positions the historical data of the analysis laboratories on the Youden graph.

Based on the accessed data, the computer generates the Designated Analysis Laboratory Table.

The computer also uses the accessed data to prepare the Shewhart diagram, and positions the historical data of the designated analysis laboratory thereon. When positioning the historical data, different symbols are used to differentiate between testing of different samples. The computer further prepares a legend for the Shewhart diagram to define which symbol represents which test sample.

The computer instructs the laser printer to print the legend for the Youden graph, the Youden graph and the historical data thereon. The computer instructs the printer to print a large solid black circle for the historical data on the Youden graph. The computer further instructs the laser printer to print the first and second deviation circles on the Youden graph as discussed above with respect to FIG. 3. The computer instructs the laser printer to print the designated analysis laboratory table. The computer also instructs the laser printer to print the Shewhart diagram, the historical data of the designated analysis laboratory thereon, and the legend for the Shewhart diagram.

The computer instructs the printer as to the positioning and symbols used for printing the above tables and graphs. Each graphic representation printed has the same basic format as illustrated in FIG. 3 described above. The above preparation and printing steps are performed to create a graphic representation for each analysis laboratory as the designated analysis laboratory.

The use of the laser printer allows printing of all the graphic representations in a short amount of time as compared to using a plotter. About 12 graphic representations a minute can be printed.

The method of the invention constitutes a powerful and fast means for obtaining the results of statistic representations regarding individual analysis laboratories participating in a quality control program. The graphic representations produced by the present invention gives the analysis laboratories the possibility of constantly improving their own validity and reliability; and, gives greater protection and security to the users of such analysis laboratories.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

I claim:

1. A method for graphically representing statistical data derived from quality control of testing carried out by analysis laboratories, each analysis laboratory having historical data of the testing, the method comprising the steps of:
   inputting the historical data of the analysis laboratories using a computer;
   inputting the statistical data which includes at least a mean and a standard deviation of the historical data using the computer;
   preparing a Youden graph based on the statistical data using the computer;
   positioning the historical data of the analysis laboratories on the Youden graph using the computer;
   printing the Youden graph on a hard copy medium using a printer;
   preparing a Shewhart diagram based on the statistical data using the computer;

positioning the historical data for one of said analysis laboratories in standard deviation units on the Shewhart diagram using the computer; and printing the Shewhart diagram on the hard copy medium using the printer.

2. The method of claim 1, wherein the inputting the statistical data step includes inputting statistical data which includes lower and upper limits, coefficient of variation, and mean of percentage deviation of the historical data of the analysis laboratories.

3. The method of claim 1, further comprising the steps of:

preparing a legend for the Youden graph defining a symbol which represents the historical data of the designated analysis laboratory using the computer;

printing the legend on the hard copy medium using the printer; and printing the defined symbol representing the historical data of the designated laboratory on the Youden graph using the printer.

4. The method of claim 3, further comprising the step of printing a designated analysis laboratory table on the hard copy medium using the printer, the table includes a code of the designated analysis laboratory, period of examination, the historical data of the designated analysis laboratory, and the statistical data.

5. The method of claim 1, further comprising the step of printing a designated analysis laboratory table on the hard copy medium using the printer, the table includes a code of the designated analysis laboratory, period of examination, the historical data of the designated analysis laboratory, and the statistical data.

6. The method of claim 5, wherein the step of printing the Youden graph includes printing the Youden graph on a left half of the hard copy medium using the printer, the hard copy medium being a sheet of paper having an A4 size format;

the step of printing the legend includes printing the legend above the Youden graph using the printer;

the step of printing the designated analysis laboratory table includes printing the designated analysis laboratory table in an upper right half portion of the A4 paper using the printer; and the step of printing the Shewhart diagram includes printing the Shewhart diagram in a lower right half portion of the A4 paper below the designated analysis laboratory table using the printer.

7. The method of claim 1, further comprising printing connecting lines between data points representing the historical data on the Shewhart diagram using the printer.

* * * * *